H. J. BEEMER.
Horse Hay-Fork.

No. 83,821.  Patented Nov. 10, 1868.

UNITED STATES PATENT OFFICE.

HORACE J. BEEMER, OF HONESDALE, PENNSYLVANIA.

Letters Patent No. 83,821, dated November 10, 1868; antedated August 21, 1868.

IMPROVEMENT IN HORSE HAY-FORKS.

The Schedule referred to in these Letters Patent and making part of the same.

*To all whom it may concern:*

Be it known that I, HORACE J. BEEMER, of Honesdale, in the county of Wayne, and State of Pennsylvania, have invented a new and improved Hay-Harpoon; and I do hereby declare that the following is a full, clear, and exact description thereof, which will enable others skilled in the art to make and use the same, reference being had to the accompanying drawings, forming part of this specification.

Similar letters of reference indicate corresponding parts.

My improvement consists in the employment of a tripping-device for holding and discharging the hay, and from the curved knives C D, and is an arrangement of a jointed lever, pivoted to the harpoon-shanks near the handle, as will be hereinafter more specifically described.

A and B are the shanks of the harpoon; C and D, the curved knives, which cut their way down into the hay when set, as in fig. 1, and which hook into and bring up a portion of the hay when set, as in fig. 2, and lifted upward. H is the handle, used in operating the harpoon. P P are pulleys guiding the tripping-line T. E is a cross-bar, fig. 3, and the same is shown dotted in figs 1 and 2, and is pivoted on the shanks A and B, for the purpose of conferring strength, as well as allowing a parallel motion of the shanks. L is a tripping-line, with its ring or eye R, to which is fastened the tripping-line T.

Figure 1:
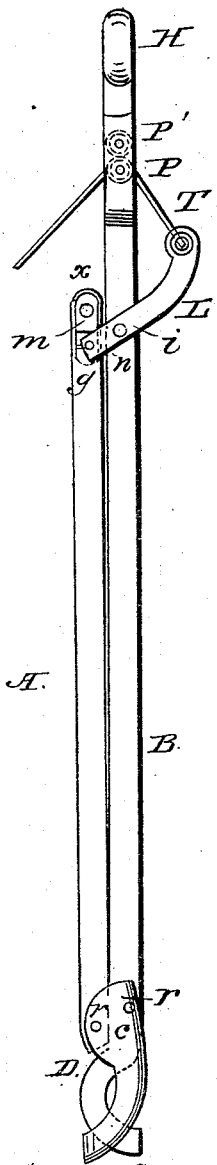
Figure 1 is a side view of my improved hay-harpoon when the hay is discharged, or before it is thrust into the hay.
Figure 2:
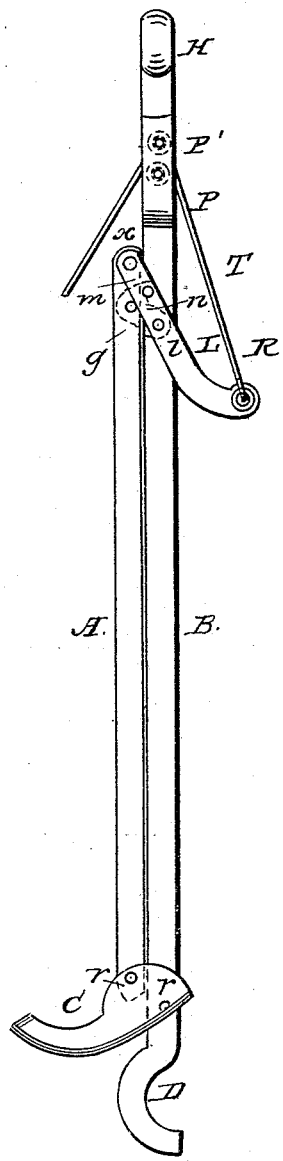
Figure 2 is the same view before the hay is discharged.
Figure 3:
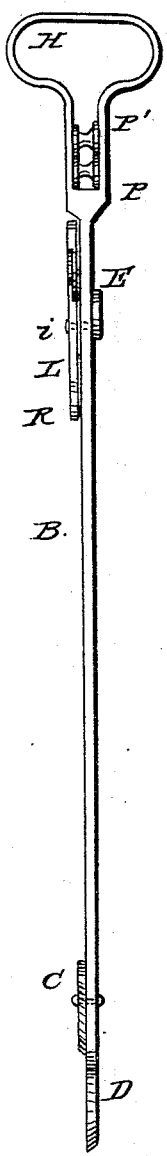
Figure 3 is a view of the harpoon at right angles with figs. 1 and 2.

The tripping-lever L is pivoted to the shanks A and B by pivots at $x$ and $i$, and this lever is jointed, and consists of two parts, $m$ and $n$, which are halved into each other, and these halved parts, $m$ and $n$, are pivoted to each other at $g$, figs. 1 and 2.

The construction of these halved parts is such that when the lever L is raised, the part $m$ vibrates slightly on its pivot $x$, and the shank A is pushed downward, thus closing the knives C and D, and setting them in position for being thrust into the hay, as shown at fig. 1.

The part $n$ of the lever then rests against the part $m$, as shown, the part $m$ being so cut away to admit of this position of the part $n$.

The contrary or upward motion of the lever L raises the part $m$, and with it the shank A, until this shank A arrives at a position above its former position, and in contact with the other shank, B, as shown in fig. 2. In this position of the shanks, the knife C has been made, by means of its pivots, to assume a horizontal direction, suitable for hooking into and lifting a portion of the hay that is above it.

The tripping-lever now has its two parts $m$ and $n$ in a line, and the two square ends of the said parts in contact, similar to the contact of an ordinary knife-blade with its spring, when opened.

The pivots $x$ $g$ $i$ are now nearly in a straight line also, but not exactly, for the pivot $g'$, joining the two parts $m$ and $n$, is placed so that it shall be slightly out of line with the pivots $x$ and $i$, so that the downward pressure of the part $m$ upon the part $n$, tends to lock or hold firmly the lever in a straight line, and consequently the shank A in its raised position, until thrown out of it by a slight application of power upon the lever-handle at L, to move it upward.

The tripping-line T passes from the eye R upward, between two pulleys, P P', which secure it in place, thus preventing its disengagement, and the consequent delay and trouble.

In operating the harpoon thus improved, the handle H is grasped by the attendant with one hand, and with the other he raises the lever L, which throws downward the shank A, by means of the jointed parts $m$ and $n$, as before described, thus closing the knives C D, which being brought together, present their ends downward. The lever is thus held till the harpoon is thrust into the hay up to the vicinity of the tripping-lever, when the latter is then pushed down by the attendant till it is locked, as shown in fig. 2, and previously described.

The harpoon is then raised by the usual rope, attached to the handle H, which rope passes over same pulley overhead, and thence to the power drawing it, usually a horse.

As the harpoon and its load rise, and are swung off to be deposited, the attendant holding the rope T pulls the same slightly, when the harpoon is over the place where the hay is to be dropped.

The lever is thus thrown out of line, and the weight of the hay completes the downward motion of the shank A, which closes the knife C, and thus liberates the hay held by it.

In the hay-harpoon known as "Drake's hay-harpoon," and upon which this is an improvement, there was no jointed lever, but a device consisting of a bar pivoted to the two shanks A and B, having the ends of said bar extended, and furnished with two handles at right angles with said bar. The locking-device has a lever pivoted to one of the shanks, and having a notch in its end, to catch upon a pin in the other shank.

In operating this harpoon, the handles aforesaid, and the lever, frequently caught in the hay-mow or elsewhere, and tripped the harpoon prematurely, thus causing delay and trouble.

The tripping-line, also, did not lead upward over a pulley, but was attached to the end of the lever, whereby it was held out nearly horizontal by the hay on the harpoon, and could only with difficulty be made to trip and discharge the hay when the harpoon swung around.

My improvements obviate these objections completely, and have, in addition, the advantages of simplicity, durability, ease of construction, and facility of operation, as has been above shown.

I claim as new, and desire to secure by Letters Patent—

The hay-harpoon, constructed as described, and consisting of the shanks A B, pivoted arm $c$, lever L, made in two parts, $m\ n$, and jointed at $g$, pivots $x\ i$, cross-bar E, and grooved pulleys P P', all constructed, arranged, and operating as set forth, and for the purpose specified.

The above specification of my invention signed by me, this 26th day of August, 1867.

HORACE J. BEEMER.

Witnesses:
  WM. F. MCNAMARA,
  ALEX. F. ROBERTS.